(No Model.) 3 Sheets—Sheet 1.

S. C. MINEAR.
CORN PLANTER.

No. 470,500. Patented Mar. 8, 1892.

Witnesses
John E. Thimmes
Maivh L. Jones

Inventor
Solomon Clement Minear

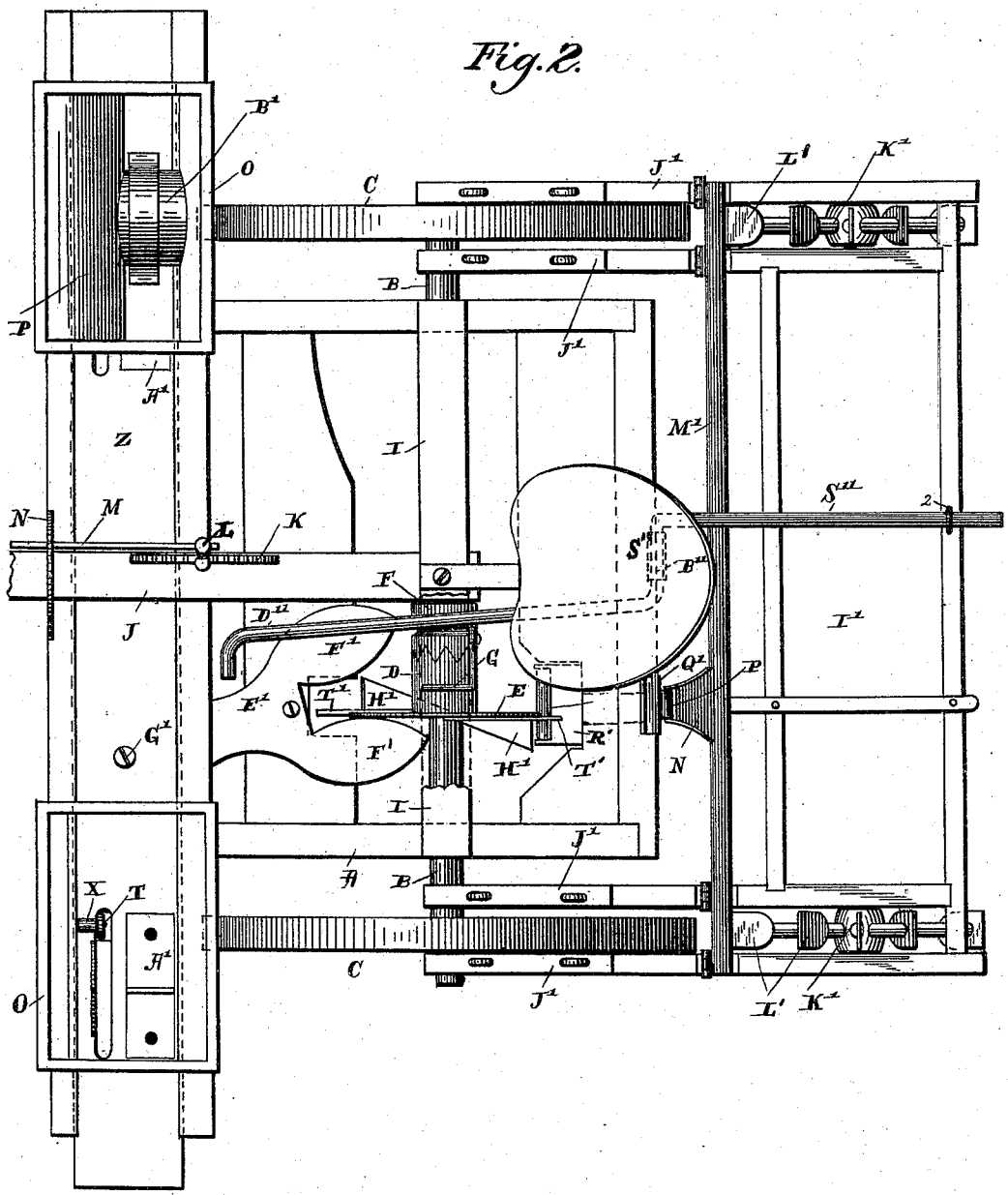

(No Model.) 3 Sheets—Sheet 3.

S. C. MINEAR.
CORN PLANTER.

No. 470,500. Patented Mar. 8, 1892.

WITNESSES:
Geo. E. Frech.
J. M. Nesbit.

INVENTOR:
S. C. Minear
per Lehmann Patteson
Attys.

UNITED STATES PATENT OFFICE.

SOLOMON CLEMENT MINEAR, OF COLUMBUS, OHIO, ASSIGNOR OF ONE-HALF TO DAVID A. WRIGHT, OF SAME PLACE.

CORN-PLANTER.

SPECIFICATION forming part of Letters Patent No. 470,500, dated March 8, 1892.

Application filed August 26, 1890. Serial No. 363,154. (No model.)

*To all whom it may concern:*

Be it known that I, SOLOMON CLEMENT MINEAR, a citizen of the United States, residing at Columbus, in the county of Franklin and State of Ohio, have invented certain new and useful Improvements in Corn-Planters, of which the following is a specification; and I do hereby declare that the following is a full, clear, and exact description of my invention, which will enable others skilled in the art to which it pertains to make and use the same.

My invention relates to an improvement in corn-planters; and it consists in the construction and arrangement of parts, which will be fully described hereinafter.

The object of my invention is to produce a corn-planter having a simple and effective dropping mechanism and a covering mechanism of a special construction, which will be fully disclosed hereinafter, whereby each hill of corn is covered and separate hills formed, which serve as guides for the driver, to enable him to plant the corn in even rows.

Figure 1:
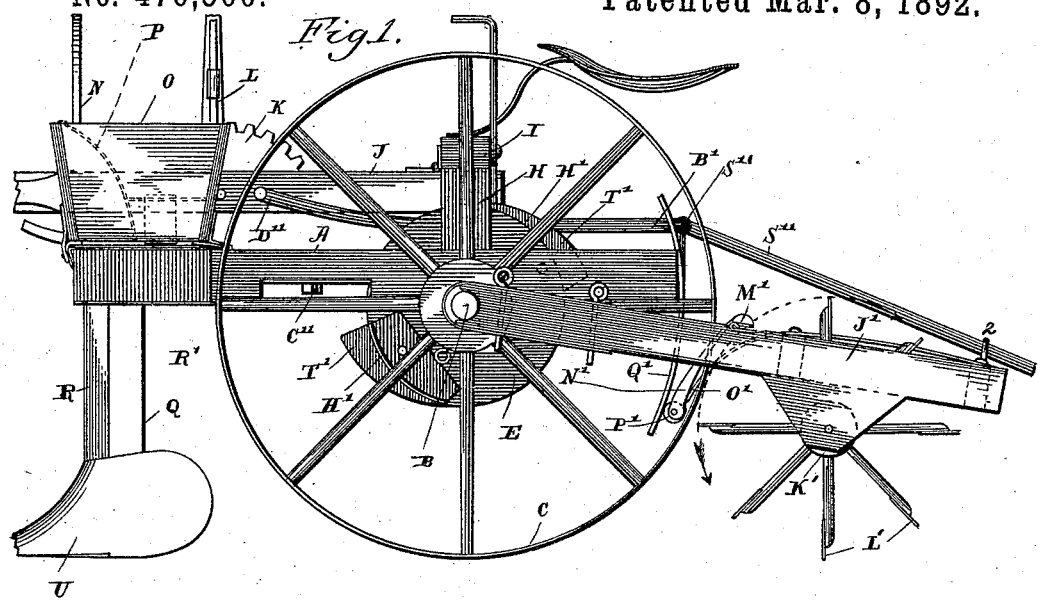
Figure 3:
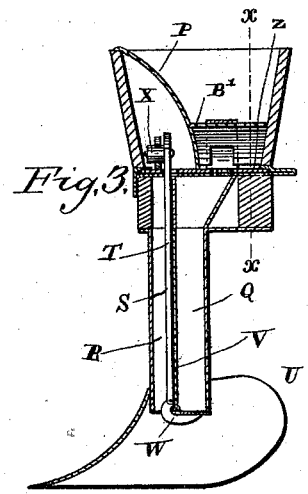
Figure 4:
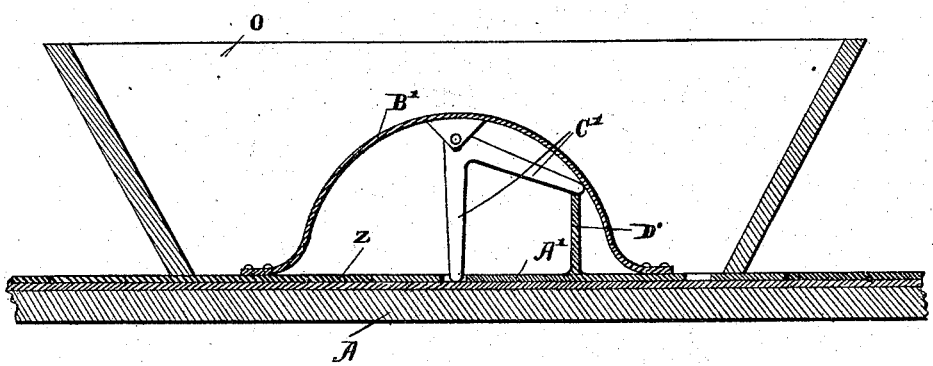
Figure 5:
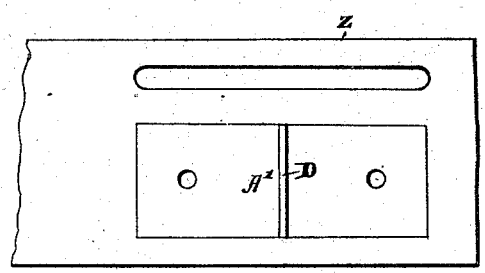
Figure 6:
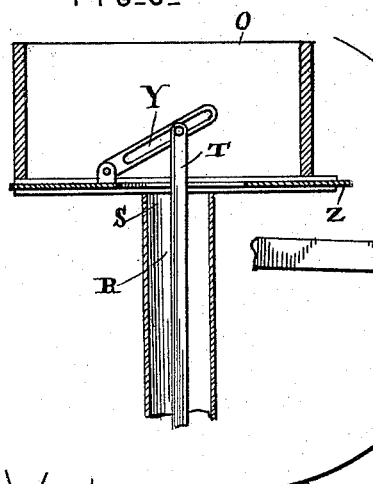
Figure 7:
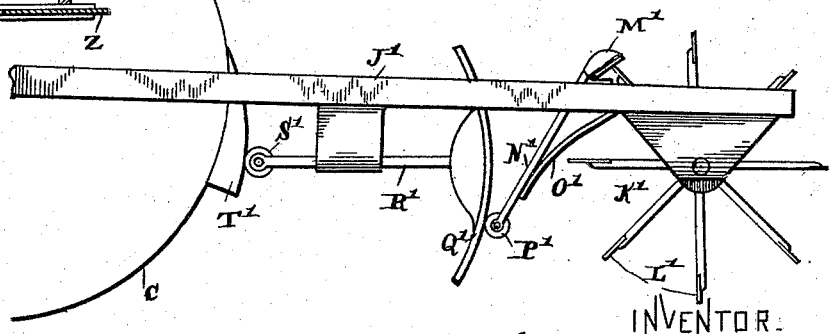

In the drawings, Figure 1 is a side elevation of a corn-planter which embodies my invention. Fig. 2 is a plan view of the same. Fig. 3 is a detached vertical section of one of the hollow opener-standards. Fig. 4 is a detached vertical section of one of the hoppers, showing the seed-ejectors. Fig. 5 is a detached plan view of one end of the feed-plate, showing the gage-plate in position. Fig. 6 is an enlarged vertical section showing the mechanism for operating the valves at the bottom of the standards. Fig. 7 is an enlarged view of the mechanism for intermittently arresting the rotation of the covering-wheel.

The main frame A consists of side parallel bars and cross connecting-bars, which are arranged in any suitable manner, and in this frame the shaft or axle B is journaled, carrying the supporting and driving wheels C. One of these wheels C is made fast to the axle, so as to cause the axle to rotate with it, while the other wheel is loosely placed upon a boxing in the ordinary manner. Placed upon this axle and revolved therewith is a sliding clutch F, which engages a second clutch D, which carries a cam-wheel E, the construction and operation of which will receive mention hereinafter. The sliding clutch F is operated by means of a handle G, which is pivoted between its ends to a cross-bar of the main frame.

Extending upward from the center of the side bars of the main frame over the axle are the two posts H, which are connected at their upper ends by means of a horizontal beam I. The tongue J is hinged or pivoted at its inner end to the front of this beam, as shown, and secured to the tongue between its ends is a segmental quadrant K. Pivoted to this quadrant K is a right-angled lever L, the lower and front end M of which engages a plate or standard N, which rises from the front end of the main frame. This lever L is held in any desired adjustment by means of an ordinary spring-catch, as will be readily understood. By means of this construction the front end of the main frame can be raised and lowered by the lever L, as may be desired, and thus regulate the depth at which the openers shall enter the soil.

Placed upon opposite front corners of this frame A are the hoppers O, which are provided with the curved division-plates P, by means of which the hoppers are divided into an open and a closed compartment, as shown.

Secured to the frame A under the hoppers are the two hollow standards R, each of which is divided into two vertical compartments Q S, the rear one Q serving as a seed or grain tube, and the front one S as a space for an operating-lever T. The standards R are preferably V-shaped in cross-section, and connected to the lower ends of these standards are the furrow-openers U, which are each provided with a mold-board upon each side, so as to open a furrow and leave a wide flat bottom thereto to allow the corn to scatter when it is dropped, and thus prevent its being choked and crowded so as to retard its proper germination.

Pivoted to the lower end of the vertical partition V of the standards R are the valves W, which have an extension reaching into the front compartment S, and to this extension the lower end of a bar T is pivoted. The upper end of this bar is provided with a laterally-extending roller X, which moves in an inclined slot Y made in a post or standard, which is pivoted at its lower end to the reciprocating feed-plate Z. As this feed-plate moves back and forth, the rod T is raised and lowered and the valve W opened and closed thereby, to allow the grain to drop into the furrow. Made in the feed-plate Z are two slots, one at each end, in which gage-plates A' are placed, and these gage-plates are each provided with a hole at each end to receive the corn to be dropped, and these holes may be varied in size in any suitable manner, so as to regulate the number of grains dropped.

Placed in the bottom of the hoppers are the U-shaped plates B', and to the tops of their inner sides are pivoted the apexes of the V-shaped seed-ejectors C'. Extending upward from the gage-plate A' is a projection B', which preferably consists of a V-shaped wire, and as the feed-plate carrying the gage-plate moves back and forth the seed-ejectors are alternately engaged and their opposite ends forced into the openings in the gage-plate, forcing all of the grain out into the grain-tube R. The feed-plate or slide is reciprocated by means of a lever E', which is pivoted between its ends to the frame of the machine, and having a slot in its front end which engages a roller placed upon a bolt G', which extends from the under side of the feed-plate. The opposite end of this lever is bifurcated and these bifurcated ends F' are curved, as shown, and are engaged by cams H', secured to the cam-wheel E, and which cause the lever to vibrate as the machine moves forward.

A rear frame I' is provided at each side with the forwardly-extending hinged beams J', and these are pivotally connected at their forward ends to the axle B. Journaled between the rear portions of these beams J' are the covering-wheels K', which are provided with a suitable number of spokes, each one of which is provided with the plates or shovels L', which throw or scrape the earth upon the seed after they are dropped, as will be made apparent further on.

Extending entirely across the frame I' in front of the covering-wheels K' is a bar M', which is hinged or pivotally connected to the said frame, the rear edge of which normally extends in the circle traveled by the shovels L', and thus locks the wheels. Extending downward and inclined forward from this bar M' is an arm N', in the lower end of which is journaled a friction-roller P'. Engaging this arm N' is a spring O', which keeps the roller P' normally in contact with the curved rear end Q' of the sliding bar R', the opposite end of this bar being provided with a roller S'. Extending from the periphery of the cam-wheel are the cams T', which engage this roller S' and force it rearward to throw the rear edge of the bar M' out of the line of the shovels L'.

By means of this construction the covering-wheels are automatically stopped and caused to drag along, so that one of the shovels will rake the earth upon the hill of corn, and is then released and allowed to revolve to the next hill, when this operation is again repeated. In this manner separate hills are formed which are guides for the driver, whereby he can plant the grain in even rows.

The cam-wheel may be provided with a series of holes for the attachment of additional cams or for the adjustment of the cams already on the wheel.

A lever having a forward operating end D'' is pivoted between its ends in a bearing S'', extending upward from the main frame A, and has a downwardly-inclined rear portion S'', which has its outer end placed in a staple 2 at the rear end of the hinged frame I'. The object of this lever is to raise the rear end of the hinged frame I' by depressing the forward end D'' of the said lever, which movement raises the covering-wheel out of contact with the ground.

Having thus described my invention, I claim—

1. In a corn-planter, the frame, an axle, the hoppers, a grain-feeding mechanism, a revolving covering-wheel having shovels, a pivoted stopping-bar for the covering-wheels, an arm extending therefrom, a sliding bar for engaging the arm, and a cam-wheel upon the axle for operating the sliding bar, the parts combined to operate in the manner and for the purpose described.

2. In a corn-planter, a main frame, hoppers, a feed-plate having outlet-openings, the openers, a means for reciprocating the feed-plate, a seed-ejector consisting of a V-shaped device pivoted at its apex in the hopper, and a projection upon the feed-plate extending between the depending arms of the seed-ejector for operating the same, the parts combined to operate in the manner shown and described.

3. In a corn-planter, a main frame, openers, supporting-wheels, a cam upon the shaft thereof, revolving covering-wheels at each side of the frame in rear of the said openers, a bar pivoted to and extending across the frame in front of the said covering-wheels, projections upon the said bar which extend in the path traveled by the covering-wheels, an arm extending downward from the said bar, and means for operating the said bar by the downwardly-extending arm, all combined substantially as set forth.

4. In a corn-planter, a main frame, supporting-wheels therefor, a second frame pivoted at its front end thereto, a means for raising the said pivoted frame, a revolving covering-wheel journaled in the said pivoted frame, a pivoted bar for stopping and releasing the said covering-wheels intermittently, an arm extending therefrom, a cam upon the driving-wheel shaft, a sliding bar engaging the said arm at one end, and a curved plate at its opposite end for engaging the pivoted bar-arm, all combined substantially as described.

SOLOMON CLEMENT MINEAR.

In presence of—
 A. H. FRITCHEY,
 J. Q. A. ROBINSON.